(12) United States Patent
Vega et al.

(10) Patent No.: US 6,265,977 B1
(45) Date of Patent: Jul. 24, 2001

(54) RADIO FREQUENCY IDENTIFICATION TAG APPARATUS AND RELATED METHOD

(75) Inventors: Victor Allen Vega, Hercules; Noel H. Eberhardt, Cupertino, both of CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/638,414

(22) Filed: Aug. 14, 2000

Related U.S. Application Data

(63) Continuation-in-part of application No. 09/151,901, filed on Sep. 11, 1998, now abandoned.

(51) Int. Cl.$^7$ ............................................... G08B 13/14
(52) U.S. Cl. ................................. 340/572.7; 340/572.8; 29/28.01; 29/592.1; 29/601; 29/DIG. 1; 29/5.8; 257/679; 343/700 MS
(58) Field of Search ..................... 340/572.7, 572.1, 340/10.1, 572.8; 29/25.01, 592.1, 601, DIG. 1, 5.8; 257/679, 688, 678, 787; 342/44, 51, 42; 343/872, 873, 700 MS

(56) References Cited

U.S. PATENT DOCUMENTS

| | | | |
|---|---|---|---|
| 4,578,626 | 3/1986 | Richter | 388/806 |
| 4,818,855 | 4/1989 | Mongeon et al. | 235/440 |
| 4,911,217 * | 3/1990 | Dunn et al. | 152/152.1 |
| 5,099,227 | 3/1992 | Geiszler et al. | 340/572.5 |
| 5,175,418 | 12/1992 | Tanaka | 235/439 |
| 5,300,875 | 4/1994 | Tuttle | 320/138 |
| 5,528,222 | 6/1996 | Moskowitz et al. | 340/572.7 |
| 5,566,441 | 10/1996 | Marsh et al. | 29/600 |
| 5,682,143 | 10/1997 | Brady et al | 340/572.7 |
| 5,786,626 | 7/1998 | Brady et al. | 257/673 |
| 5,847,447 * | 12/1998 | Rozin et al. | 257/678 |
| 5,850,187 | 12/1998 | Carrender et al. | 340/10.6 |
| 5,854,480 | 12/1998 | Noto | 235/492 |
| 6,001,211 | 12/1999 | Hiroyuki | 156/277 |
| 6,100,804 * | 8/2000 | Brady et al. | 340/572.7 |

FOREIGN PATENT DOCUMENTS

| | | |
|---|---|---|
| DE 40 17 934 C2 | 12/1993 | (DE) . |
| 0 245 196 A2 | 4/1987 | (EP) . |
| 0 260 221 A2 | 9/1987 | (EP) . |
| 0 260 221 A3 | 9/1987 | (EP) . |

* cited by examiner

*Primary Examiner*—Benjamin C. Lee
(74) *Attorney, Agent, or Firm*—Terri S. Hughes

(57) ABSTRACT

A radio frequency identification device (100, 200, 300, 350, 400, 500, 700) includes a substrate member (110) having a first surface (109) and a second surface (111). Disposed on the first surface of the substrate member are a first antenna element (112) and a second antenna element (114). The first and second antenna elements are electrically isolated from each other and are coupled to two separate pads on an integrated circuit (116, 116'). The integrated circuit includes a power circuit (814) that produces a supply voltage for electronics on the integrated circuit in response to voltages coupled over the air to the pads on the integrated circuit via the first and second antenna element. Adhesive (118) is applied on the first surface of the substrate, the first and second antenna elements and the integrated circuit for securing the tag to a person or thing.

17 Claims, 6 Drawing Sheets

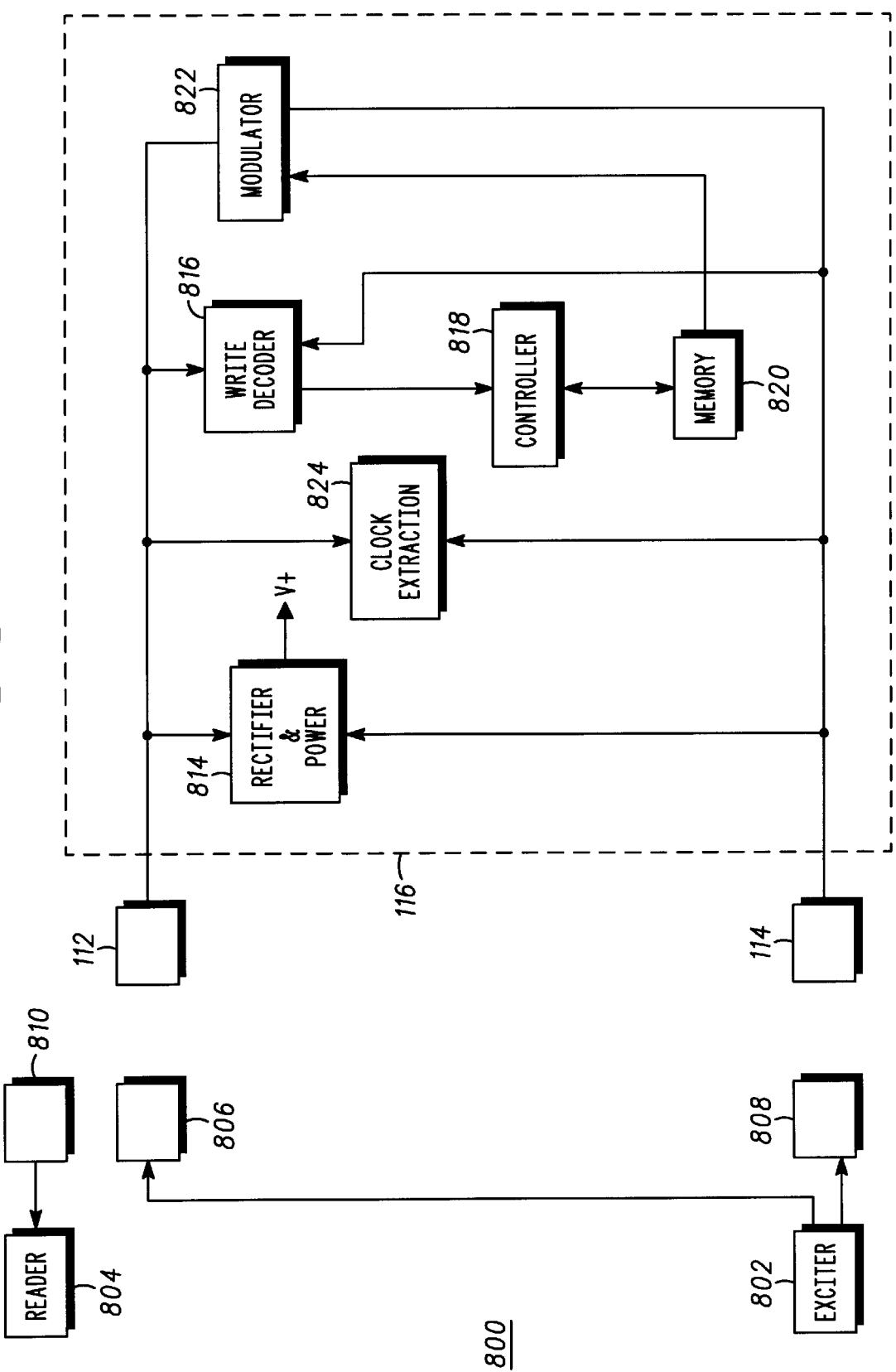

RADIO FREQUENCY IDENTIFICATION TAG APPARATUS AND RELATED METHOD

CROSS-REFERENCE TO RELATED APPLICATIONS

The present application is based on prior U.S. application Ser. No. 09/151,901, filed on Sep. 11, 1998, now abandoned, which is hereby incorporated by reference, with the same effect as though it were fully and completely set forth herein, and priority thereto for common subject matter is hereby claimed.

This application is a continuation-in-part of commonly assigned prior U.S. patent application Ser. No. 09/151,901, filed Sep. 11, 1998 by Victor Vega et al., titled "Radio Frequency Identification Tag Apparatus and Related Method," the disclosure of which prior application is hereby incorporated by reference, verbatim and with the same effect as though it were fully and completely set forth herein.

Also, this application is a continuation-in-part of commonly assigned prior U.S. patent application Ser. No. 08/540,813, filed Oct. 11, 1995 by Ted Geiszler et al., now abandoned, entitled "Remotely Powered Electronic Tag and Associated Exciter/Reader and Related Method," the disclosure of which prior application is hereby incorporated by reference, verbatim and with the same effect as though it were fully and completely set forth herein.

Also, this application is a continuation-in-part of commonly assigned prior U.S. patent application Ser. No. 09/031,848, filed Feb. 27, 1998 by Victor Allen Vega et al., now abandoned, entitled "Radio Frequency Identification Tag System Using Tags Arranged for Coupling to Ground," the disclosure of which prior application is hereby incorporated by reference, verbatim and with the same effect as though it were fully and completely set forth herein.

Also, this application is a continuation-in-part of commonly assigned prior U.S. patent application Ser. No. 09/045,357, filed Mar. 20, 1998 by Victor Allen Vega et al., entitled "Radio Frequency Identification Tag with a Programmable Circuit State," the disclosure of which prior application is hereby incorporated by reference, verbatim and with the same effect as though it were fully and completely set forth herein.

FIELD OF THE INVENTION

This invention relates generally to an apparatus and method for electrostatic radio frequency identification devices, and in particular to a thin, flat, flexible, printable electrostatic radio frequency identification device and associated method.

BACKGROUND OF THE INVENTION

Remotely powered electronic devices and related systems are known. For example, U.S. Pat. No. 5,009,227 issued to Geiszler et al. entitled Proximity Detecting Apparatus, discloses a remotely powered device which uses electromagnetic coupling to derive power from a remote source and then uses both electromagnetic and electrostatic coupling to transmit stored data to a receiver often collocated with the remote source. Such remotely powered communication devices are commonly known as radio frequency identification ("RFID") tags.

Earlier RFID tags and systems primarily use electromagnetic coupling to remotely power the remote device and couple the remote device with an exciter system and a receiver system. The exciter system generates an electromagnetic excitation signal used to power up the device and cause the device to transmit a signal including stored information. The receiver receives the signal produced by the remote device.

Known electromagnetic coupling mechanisms include an oscillator as part of the exciter system and a coil antenna on both the exciter system and the remote tag that employs the identification device, including an electronic circuit. For example, in an earlier system, excitation circuitry is connected to a coil antenna that radiates excitation signals that are picked up by a coil antenna mounted on a tag that contains the electronic circuit. The excitation signals energize the circuit, which then provides an information-carrying signal that is transmitted to the receiver using electromagnetic or electrostatic coupling.

One problem with the use of electromagnetic coupling between a remote device and either an exciter or a receiver has been the complexity involved in the manufacture of remote devices that employ a coil antenna. The spiral layout of a typical coil antenna makes it more difficult to produce, increases cost and also the size of the remote device. The coil antennas require tight tolerances for efficient performance. Additionally, typical coil antennas have undesirable thermal compression characteristics that affect, in particular, the ability to create a flat tag or remote device that encompasses the coil.

Radio frequency identification tags and associated systems have numerous uses. For example, radio frequency identification tags are frequently used for personal identification in automated gate sentry applications protecting secured buildings or areas. These tags often take the form of access control cards. Information stored on the radio frequency identification tag identifies the person seeking access to the secured building or area. Older automated gate sentry applications require the person accessing the building to insert or swipe their identification tag into or through a reader for the system to read the information from the identification tag. Newer radio frequency identification tag systems allow the radio frequency identification tag to be read at a short distance using radio frequency data transmission technology, thereby eliminating the need to insert or swipe an identification tag into or through a reader. Most typically, the user simply holds or places the radio frequency identification tag near a base station, which is coupled to a security system securing the building or area. The base station transmits an excitation signal to the radio frequency identification tag that powers circuitry contained on the radio frequency identification tag. The circuitry, in response to the excitation signal, communicates stored information from the radio frequency tag to the base station, which receives and decodes the information. The information read is used by the security system to determine if access is appropriate. Also, radio frequency identification tags may be written remotely by an excitation signal appropriately modulated in a predetermined manner.

In addition to typical applications for access control of persons, RFID tags may be useftil in electronic animal identification, baggage tracking, parcel tracking, inventory management applications, asset identification and tracking, and other applications involving identification of things. These applications involve transmitting stored information from a tag to an exciter/reader system in close proximity with the tag. Also, these applications may involve writing information to a tag. RFID tags for these applications may need to be durable for long-term use or disposable, for temporary use.

In applications for identification of persons and things, bar codes are almost universally employed. Generation of the bar code is very inexpensive. However, one problem associated with bar codes and bar code readers is that the bar codes must be precisely aligned with the bar code reader in order to be read. Another problem with bar codes is that the bar codes may become unreadable as a result of damage, for example, exposure to moisture, or wear and tear from use. RFID tags address some of the shortcomings of bar codes.

In addition to the need to transmit stored information via radio frequency transmission, it is often desirable for an RFID tag to have indicia perceptible to persons, including printed information, logos, photographs or other printed or graphical data. In many applications, the printed indicia must be customizable for a single use, necessitating the ability to print or otherwise place indicia directly on the RFID tag. This requires the RFID tag to be very thin, very flat and flexible to be compatible with existing printing technologies, including dye sublimation printing, ink jet printing and flexographic printing. Prior RFID tags incorporating coils are limited in their ability to be flat, thin and flexible, not to mention the associated cost. This has limited their ability to be printed, particularly in the area near the coil antenna.

Therefore, there is a need for a thin, flat, flexible, printable radio frequency identification tag.

BRIEF DESCRIPTION OF THE DRAWINGS

FIG. 12 is a block diagram illustrating a radio frequency identification tag system 4 in accordance with a preferred embodiment of the present invention.

DETAILED DESCRIPTION OF THE PREFERRED EMBODIMENTS

A radio frequency identification (RFID) device includes a substrate having a first surface and a second surface. Disposed on the first surface of the substrate are a first antenna element and a second antenna element. The first and second antenna elements are electrically isolated from each other and are coupled to two separate pads on an integrated circuit. The integrated circuit includes a power circuit that produces a supply voltage for electronics on the integrated circuit in response to voltages coupled over the air to the pads on the integrated circuit via the first and second antenna elements. In one embodiment, adhesive is applied on at least a portion of the first surface of the substrate, the first and second antenna elements and the integrated circuit, for securing the device to a person or thing. In another embodiment, a cover layer is secured to the first surface of the substrate to cover the integrated circuit. As discussed herein, a wide variety of nonconductive materials are used for the substrate. And, a wide variety of conductive materials are used for the first and second antenna elements. The radio frequency identification device is preferably programmed with information and also printed with indicia such as text, graphics or photographs. The RFID device has a myriad of uses in applications for identifying persons or things. For purposes of the following discussion, the RFID device is a tag, however, the RFID device can be any article of manufacture.

Figure 1:
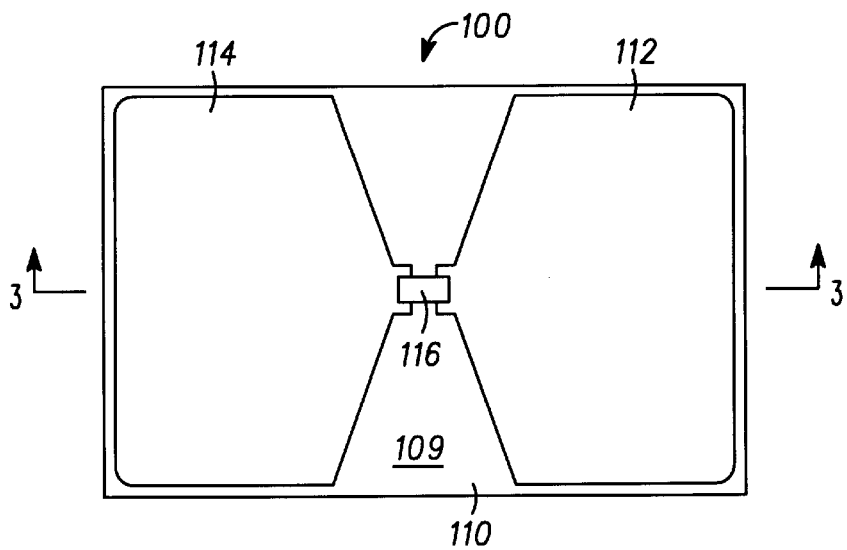
FIG. 1 is a back plan view of a radio frequency identification tag in accordance with a preferred embodiment of the present invention.

FIG. 1 shows a back plan view of a RFID tag 100 in accordance with the present invention. Tag 100 has a substrate 110, a first antenna element 112, a second antenna element 114 and an integrated circuit 116. Substrate 110 provides a base for holding the components of tag 100. Formed on a first surface 109 of substrate 110 are the first antenna element 112 and the second antenna element 114. The first and second antenna elements 112, 114 are electrically isolated from each other. Integrated circuit 116 contains the electronics associated with tag 100 and is coupled to first antenna element 112 and second antenna element 114 via pads (not shown) on integrated circuit 116. Optionally, an adhesive is on the first surface 109 of substrate 110 and antenna elements 112, 114 for attaching tag 100 to another surface or article (not shown).

Figure 2:
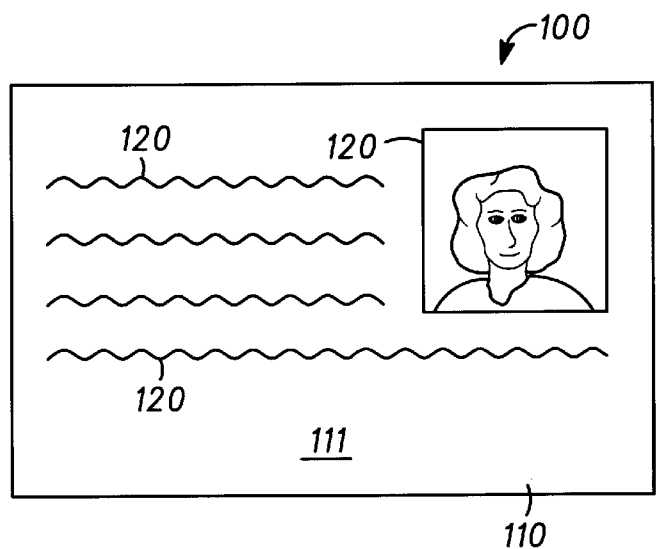
FIG. 2 is a front plan view of the tag of FIG. 1.

FIG. 2 shows a front plan view of radio frequency identification tag 100. The front surface 111 of tag 100 is formed by the second surface 111 of substrate 110. Preferably, second surface 111 of substrate 110 has indicia 120, which includes printed text, photographs, graphics or any other perceptible indicia. However, any surface of substrate 110, including the first surface 109, can be used to display indicia. The indicia can be formed on any surface of the substrate by a variety of techniques, including, but not limited to, direct thermal imaging and thermal transfer imaging.

Figure 3:
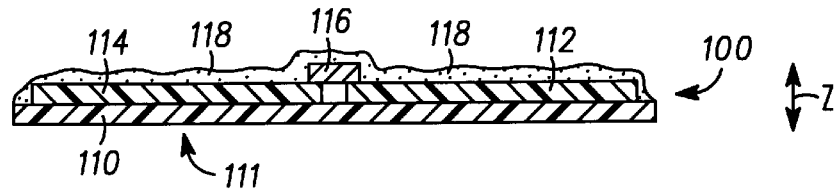
FIG. 3 is a cross-sectional view of the tag of FIG. 1 taken along line 3—3.

FIG. 3 is a cross-sectional view of tag 100 taken along line 3—3 of FIG. 1. As best seen in FIG. 3, first and second antenna elements 112, 114 are disposed on substrate 110. Integrated circuit 116 is coupled to first antenna element 112 and second antenna element 114. Adhesive 118 may rest on any available or exposed surface on the tag, including the surface of integrated circuit 116, the surfaces of first and second antenna elements 112, 114 and the substrate 110. Adhesive 118 is shown in FIG. 3 as a continuous layer, but drops of adhesive, a film or any other form of adhesive is a suitable substitute. Tag 100 shown in FIGS. 1–3 has a generally rectangular configuration. However, the shape and configuration of tag 100 varies depending upon the application. Also, the thickness of tag 100 varies and is only limited by the thickness of substrate 110, first and second antenna elements 112, 114 and integrated circuit 116.

Substrate 110 provides the base for tag 100. Substrate 110 is composed of any non-conductive component. Suitable materials for substrate 110 include paper, acetate, polyester, polyethylene, polypropylene, polypropylene with calcium carbonate, polyvinyl chloride, acrylonitrile butadiene styrene (ABS), polymers, or plastic. The selection of material for substrate 110 will vary depending upon the application. For example, for an application wherein tag 100 is disposable, substrate 110 is preferably paper. For an application where tag 100 is durable and reusable, for example as an access control card, substrate 110 is preferably plastic, polymers, polyvinyl chloride or polyester.

Substrate 110 is alternatively formed from a web of material or from discrete portions of a material. The preferred form of material used for substrate 110 varies depending on the application for tag 100 and the process used to manufacture tag 100. For example, for manufacture of tag 100 using a web printing process, substrate 110 is preferably formed from a rolled web of paper or other material. Alternatively, for example, substrate 110 is formed from a fan-folded web of paper or other material or a sheet of substrate material.

First and second antenna elements 112, 114 are formed from numerous suitable conductive materials. The conductivity of antenna elements 112, 114 may vary considerably with little or no performance degradation. For example, antenna elements 112, 114 with conductivity from 0 ohms per square to 500 K-ohms per square are operable for read-only and read/write applications. Suitable materials for antenna elements 112, 114 include conductive ink, conductive polymers, wire, or a conductive metal material. More specifically, suitable materials for antenna elements 112, 114 include copper, graphite, metalized polyester, aluminum, silver ink, carbon blacks, and carbon ink. Antenna elements 112, 114 are placed on substrate 110 using any suitable process including printing, lamination, adhesively securing, and deposition. The shape of antenna elements 112, 114 is not limited, but preferably, for optimal performance, antenna elements 112, 114 consume substantially all of the available surface area on substrate 110. The impedance characteristics of antenna elements 112, 114 are preferably varied by the type of materials selected and by the dimensions and concentrations of the selected materials. For example, where conductive ink is used for antenna elements 112, 114, multiple applications of the conductive ink are used to vary the impedance characteristics. Unlike predecessor radio frequency identification tags that relied on electromagnetic coupling, antenna elements 112, 114 are not a coil.

Integrated circuit 116 houses the circuitry for powering up the radio frequency identification tag and sending a stored signal or information in response to receipt of an electrostatic exciter signal. For some applications, integrated circuit 116 includes the circuitry to write new information into the tag in response to an electrostatic exciter signal. The functions of integrated circuit 116 are discussed further below with respect to FIGS. 12–13.

Adhesive 118 may be used to secure tag 100 to an article or surface. Suitable materials for adhesive 118 include non-conductive and conductive adhesives. Preferably, adhesive 118 is a non-conductive transfer adhesive film. Adhesive 118 may be applied on tag 100 in any manner including covering the entire available surface area of the tag and associated components or covering only certain components of the tag. However, if an isotropic conductive adhesive (conductive in all directions) is used, the adhesive must be applied in a manner that does not provide a conductive path between first and second antenna elements 112, 114.

Integrated circuit 116 is coupled to the first antenna 112 and second antenna 114 by any suitable manner that allows an electrical connection between the integrated circuit 116 and the antennas 112, 114, yet isolates antennas 112, 114 from each other. A preferred method for coupling integrated circuit 116 to antennas 112, 114 is an anisotropic conductive adhesive that conducts in the "Z" direction, as shown in FIG. 3, however, any suitable adhesive, conductive or non-conductive, may be used. For example, an isotropic adhesive is used as long as the isotropic adhesive used to couple first antenna 112 is isolated from the isotropic adhesive used to couple the second antenna 114. An alternate method for coupling integrated circuit 116 to antennas 112, 114 is with double-sided, conductive, pressure sensitive adhesive tape. A preferred anisotropic adhesive tape is model number 9703 sold by 3M Corporation of Minneapolis, Minn. A preferred isotropic adhesive tape is model number 335-1 sold by Ablestik of Rancho Dominguez, Calif. As another alternative, an anisotropic adhesive is applied over the entire, or selected portions, of antenna elements 112, 114, and the first surface of substrate 110 prior to attaching integrated circuit 116. Hence, the anistrophic adhesive serves the dual function of (1) coupling integrated circuit 116 to antenna elements 112, 114, and (2) attaching tag 100 to an article or person—i.e., the function of adhesive 118.

Figure 4:
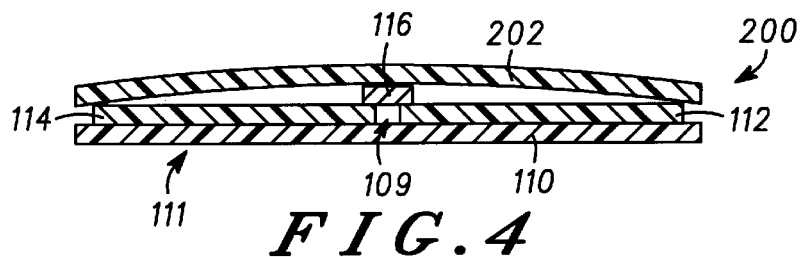
FIG. 4 is a cross-sectional view of a radio frequency identification tag in accordance with an alternate preferred embodiment of the present invention.

FIG. 4 shows a cross-sectional view of another embodiment of a radio frequency tag 200 in accordance with the present invention. The front and back plan views of tag 200 are similar to the front plan view of tag 100 shown in FIG. 2, except, of course, the indicia on the tag varies. The cross-sectional view is taken along a line corresponding to line 3—3 of FIG. 1. Tag 200 is similar to tag 100, except that a cover layer 202 is used to cover integrated circuit 116, first and second antenna elements 112, 114 and the first surface 109 of substrate 110. Cover layer 202 has the same surface area as substrate 110. Cover layer 202 is any suitable material and preferably has a flat surface with printed indicia formed thereon. Suitable materials for cover layer 202 include paper, acetate, polyester, polyethylene, polypropylene, polypropylene with calcium carbonate, polyvinyl chloride, ABS, polymers, plastic, electrically insulating tape, or any other suitable nonconductive member.

Figure 5:
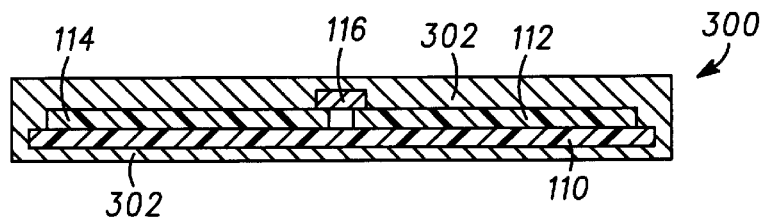
FIG. 5 is a cross-sectional view of a radio frequency identification tag in accordance with an alternate preferred embodiment of the present invention wherein the tag is formed by injection molding.

FIG. 5 shows a cross-sectional view of another embodiment of a radio frequency identification tag 300 in accordance with the present invention. Radio frequency identification tag 300 is similar to tags 100, 200 except that a cover layer 302 is provided around and over the entire substrate 110, antenna elements 112, 114 and integrated circuit 116. The front and back plan views of tag 300 are similar to the front plan view of tag 100 shown in FIG. 2, except, of course, the indicia on the tag varies. The cross-sectional view is taken along a line corresponding to line 3—3 of FIG. 1. Cover layer 302 is preferably formed by injection molding and substrate 110 is preferably an etiquette. Most preferably, the etiquette is a pre-printed label inserted into an injection or transfer mold and encapsulated with plastic.

Figure 6:
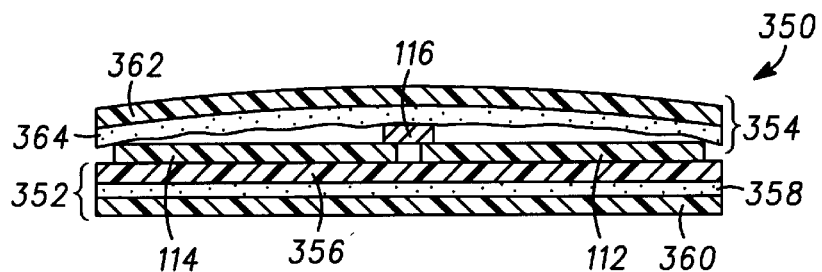
FIG. 6 is a cross-sectional view of a radio frequency identification tag in accordance with an alternate preferred embodiment of the present invention wherein the tag is formed using adhesive-backed label stock.

FIG. 6 shows a cross-sectional view of an embodiment of the invention that provides a radio frequency identification tag 350 made from adhesive-backed label stock. More specifically, a substrate 352 and a cover layer 354 are both derived from adhesive-backed label stock. Substrate 352 is comprised of a base layer 356, an adhesive layer 358, and a removable release liner 360. Similarly, cover layer 354 is comprised of a base layer 362 and an adhesive layer 364. A removable release liner (not shown) has been removed from cover layer 354 to allow adhesive attachment of cover layer 354 to tag 350. Antenna elements 112, 114 are disposed on base layer 356 of substrate 352 and integrated circuit 116 is coupled to antenna elements 112, 114. Cover layer 354 preferably has indicia disposed on its surface. Base layers 356, 362 are formed from any suitable material including the materials discussed above for use as substrate 110 or cover layer 202. Conventional materials for release liner 360 are used. Adhesive layers 358, 364 are any suitable adhesive including releasable and permanent adhesives.

The embodiments of the invention shown in FIGS. 1–6 form relatively flat, thin and flexible radio frequency identification tags. These tags are adapted to be printed by a number of printing processes including via dye-sublimation printing, ink jet printing, flexographic printing, web printing, screen printing, offset printing, hot stamping, pad transfer printing, thermal transfer imaging, xerographic printing, lithographic printing, and the like, without modification of the printing process.

The embodiments of the invention shown in FIGS. 1–6 may have some irregularity in the second surface due to the thickness of integrated circuit 116, which does not extend across the entire surface area of the tag. This irregularity is sometimes exaggerated where the tags are stacked. In some applications there may be an advantage to preventing the irregularity caused by the thickness of integrated circuit 116.

Figure 7:
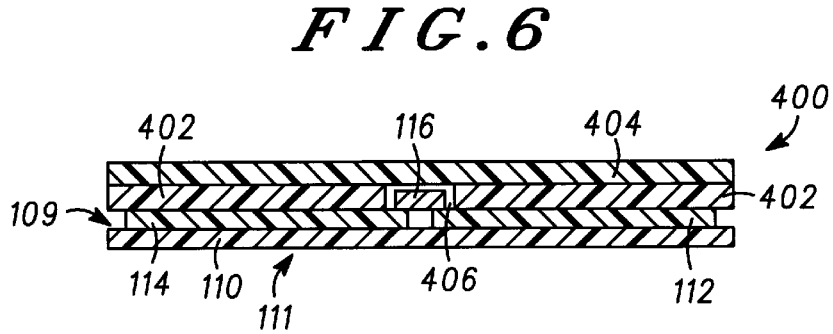
FIG. 7 is a cross-sectional view of a radio frequency identification tag in accordance with an alternate preferred embodiment of the present invention wherein the tag includes a filler layer to form an extremely flat tag.

FIG. 7 shows a cross-sectional view of an embodiment of the invention that provides an extremely flat radio frequency identification tag 400 and addresses the minor irregularity that may be caused by integrated circuit 116. Tag 400 has substrate 110 with front surface 111 and back surface 109. Antenna elements 112, 114 are on back surface 109 and integrated circuit 116 is coupled to antenna elements 112, 114. A filler layer 402 rests between antenna elements 112, 114 and a cover layer 404. Filler layer 402 preferably has a configuration similar to substrate 110 and cover layer 404, except an aperture 406 is formed in filler layer 402 that is sized to receive integrated circuit 116. Alternatively, filler layer 402 is comprised of a plurality of layers disposed adjacent integrated circuit 116. Most preferably, filler layer 402 has a thickness substantially equal to the thickness of integrated circuit 116. Filler layer 402 is secured between substrate 110 and cover layer 404 in any suitable manner including frictionally, adhesively, oven molding, and lamination.

The embodiment shown in FIG. 7 is particularly useful where tag 400 is incorporated into a baggage tag or other form that has multiple layers or sheets, for example, multiple layers of copies or "carbon copies" of the same form. Substrate 110 serves as one layer of the form; cover layer 404 serves as another layer of the form; and filler layer 402 serves as another layer of the form. Filler layer 402 is either blank and non-functional or functional, for example, as another carbon copy of the form.

Figure 8:
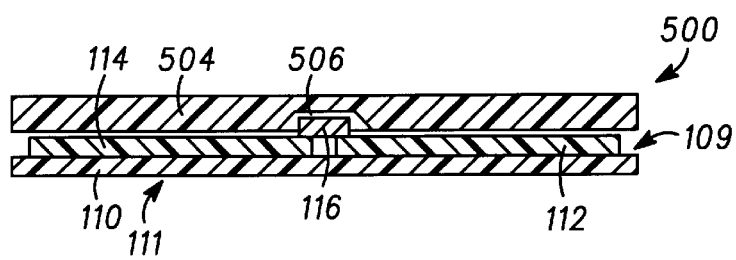
FIG. 8 is a cross-sectional view of a radio frequency identification tag in accordance with an alternate preferred embodiment of the present invention wherein the tag includes a cavity for receiving an integrated circuit.

FIG. 8 shows a cross-sectional view of another embodiment of the invention that provides an extremely flat radio frequency identification tag 500. Tag 500 reduces or eliminates any irregularity in the surface of the tag due to the presence of the integrated circuit. Tag 500 includes substrate 110 with first surface 109 and second surface 111. Antenna elements 112, 114 are disposed on first surface 109 and integrated circuit 116 is coupled to antenna elements 112, 114. A cover layer 504 covers first surface 109 of substrate 110, antenna elements 112, 114 and integrated circuit 116. As discussed above with respect to cover layers of other embodiments, cover layer 504 is secured to the other components by any suitable manner. Cover layer 504 has a recessed portion or cavity 506. Cavity 506 is preferably sized to receive integrated circuit 116 while maintaining a flat, planar surface for cover layer 504. Cavity 506 typically has a rectangular or square configuration to coincide with the shape of integrated circuit 116, or alternatively, cavity 506 is circular or has a track extending the surface of the cover layer 504. Cover layer 504 is formed by any suitable material including the materials listed above for use as substrate 110 and cover layer 202.

In embodiments of the invention shown in FIGS. 1–8, the integrated circuit 116 is shown directly attached to the first and second antenna elements 112, 114. This direct attachment requires precise alignment of integrated circuit 116 with the appropriate antenna element. More precisely, the pads on integrated circuit 116 must be carefully aligned with the antenna elements 112, 114. The pads on integrated circuit 116 are as small as 110 square mils or smaller, hindering the ability to precisely make a connection.

Figure 9:
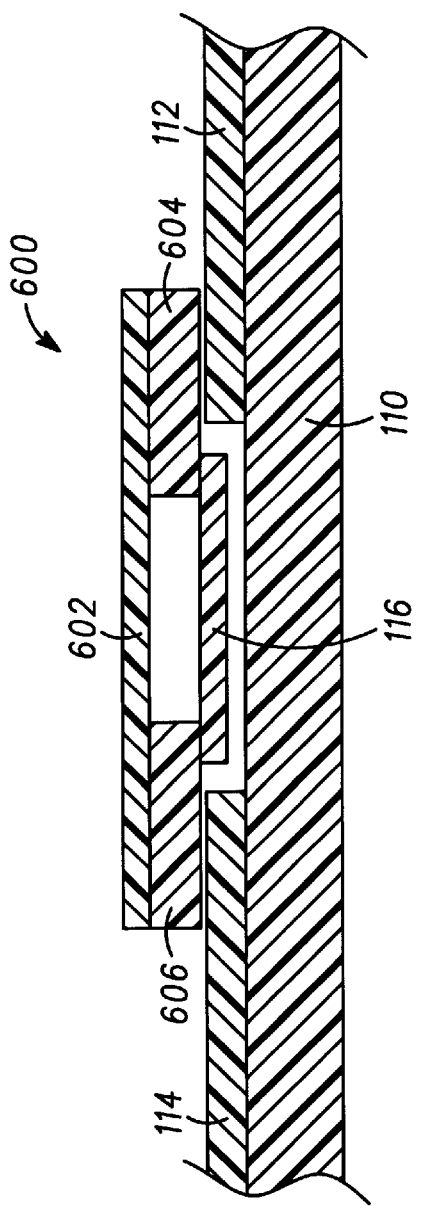
FIG. 9 is a cross-sectional view of a radio frequency identification tag in accordance with an alternate preferred embodiment of the present invention wherein an interposer is used to couple an integrated circuit to the tag.
Figure 10:
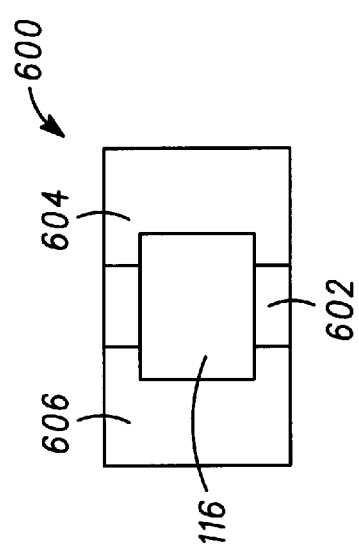
FIG. 10 is a plan view of the interposer and integrated circuit shown in FIG. 9.

The embodiment of the invention shown in FIGS. 9–10 uses an intermediary, referred to as an "interposer" 600, to attach integrated circuit 116 to antenna elements 112, 114 in a radio frequency identification tag. Interposer 600 reduces the amount of precision required to successfully couple integrated circuit 116 to antenna elements 112, 114. This facilitates manufacture of the RFID tag by more processes with less expense.

FIG. 10 is a plan view of the front side of interposer 600. Interposer 600 has a substrate 602. Disposed on substrate 602 are a first interposer connecting pad 604 and a second interposer connecting pad 606. Disposed on and coupled to the first and second interposer connecting pads 604, 606 is integrated circuit 116. As best seen in FIG. 9, integrated circuit 116 is secured to the first and second interposer connecting pads 604, 606, which in turn are secured and coupled to the first and second antenna elements 112, 114, respectively. This facilitates an electrical connection between integrated circuit 116 and first and second antenna elements 112, 114. Substrate 602 is any suitable material, including the materials mentioned above for use as substrate 110. Similarly, interposer connecting pads 604, 606 are any suitable conductive material, including the materials discussed above with respect to first and second antenna elements 112, 114. Integrated circuit 116 is secured or bonded to interposer connecting pads 604, 606 using an adhesive or any bonding technique, including the adhesives mentioned above for coupling integrated circuit 116 to antenna elements 112, 114.

Figure 11:
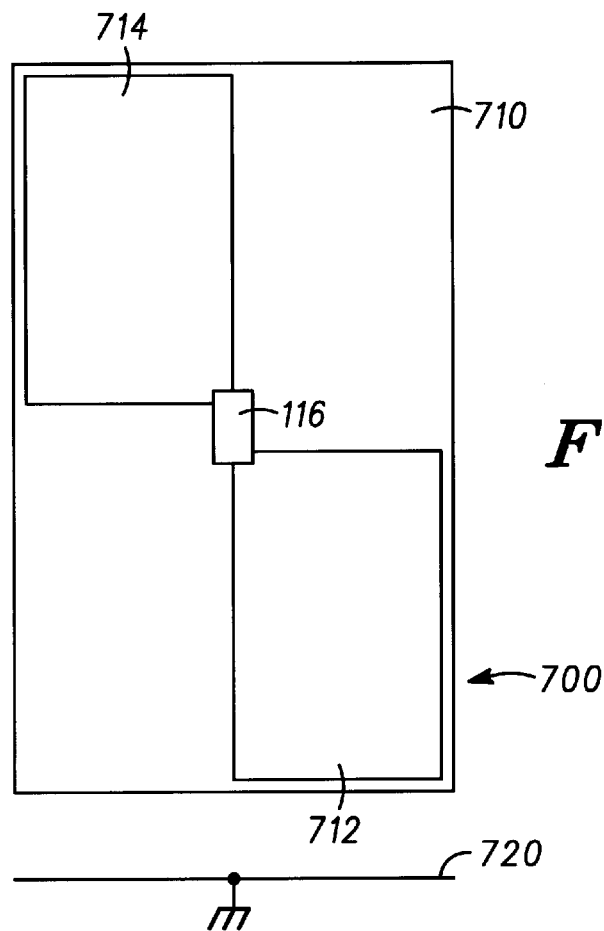
FIG. 11 is a back plan view of a radio frequency identification tag in accordance with an alternate preferred embodiment wherein the arrangement of antenna element is varied.

FIG. 11 is an alternate preferred embodiment of the invention showing a back plan view of a tag 700. Tag 700 has antenna elements 712, 714 disposed on substrate 710. Integrated circuit 116 is disposed on and coupled to antenna elements 712, 714. Tag 700 corresponds in its components to tag 100, except that the arrangement of the antenna elements 712, 714 is different from the arrangement of antenna elements 112, 114. More specifically, antenna elements 112, 114 form a "bow tie" pattern and antenna elements 712, 714 form a "checker board" pattern. Tag 700 is preferred in an application where tag 700 is likely to be oriented with respect to ground 720 as shown in FIG. 11. In this orientation, one of the antenna elements, in this case, antenna element 712, is closer to ground than the other antenna element, in this case, antenna element 714. The checkerboard pattern advantageously maintains the relative relationships between the antenna elements and ground throughout rotations of tag 700. It should be noted that the arrangement of the antenna elements, however, can have a variety of forms and shapes, including, but not limited to, symmetrical patterns, non-symmetrical patterns, and/or unequal patterns.

FIG. 12 is a block diagram illustrating a radio frequency identification tag system 800 including an exciter 802, reader 804 and integrated circuit 116. Exciter 802 is coupled to a first electrostatic antenna element 806 and a second electrostatic antenna element 808. Reader 804 is coupled to an electrostatic antenna element 810. Integrated circuit 116 is coupled to a first electrostatic antenna element 112 and a second electrostatic antenna element 114. In operation, exciter 802 generates a signal that is electrostatically (capacitively) coupled to integrated circuit 116 from electrostatic antenna elements 806, 808 to electrostatic antenna elements 112, 114. The signal generated by exciter 802 may include information that is to be written to integrated circuit 116. In response to the signal from exciter 802, circuit 116 powers the electronics, writes the appropriate information and generates a read signal that is electrostatically coupled over the air to reader 804 via electrostatic antenna element 810. Reader 804 reads the signal to decode the information for use by other systems (not shown).

Integrated circuit 116 includes a rectifier and power circuit 814, a write decoder 816, a controller 818, a memory 820, a modulator 822 and a clock extraction circuit 824. Rectifier and power circuit 814 is coupled to antenna elements 112, 114 to receive the electrostatically coupled signal from exciter 802. This alternating current (A.C.) signal is rectified by rectifier and power circuit 814 to produce a direct current (D.C.) signal that is then regulated to provide a power supply voltage V+ for integrated circuit 116. The A.C. signal from exciter 802 is passed to write decoder 816. Write decoder 816 decodes the information modulated into the signal by exciter 802 to determine the appropriate action to be taken by integrated circuit 116. Write decoder 816 is coupled to controller 818. Write decoder 816 decodes the signal from exciter 802 into a write command. Controller 818 controls a memory 820 which is written in response to an appropriate signal or write command from exciter 802 and/or read from in response to an appropriate signal from exciter 802. Memory 820 stores digital information. Information read from memory 820 is modulated by modulator 822, which provides a signal that is electrostatically coupled through at least one of antenna elements 112, 114 to be received by reader 804. Clock extraction circuit 824 creates a clock signal for integrated circuit 116 based on the A.C. signal received from the exciter 802.

Integrated circuit 116 shown in FIG. 12 is a circuit for use in a radio frequency identification tag that can be read and written. A preferred radio frequency identification circuit that can be read and written is the Temic e5550 circuit chip available from Temic North America, Inc., Basking Ridge, N.J. For an integrated circuit that is read only, write decoder 816 need not be included for determining write instructions. A preferred integrated circuit for use in a read only radio frequency identification tag is the Indala I341 circuit chip, available from Indala Corporation, a wholly owned subsidiary of Motorola, Inc, 3041 Orchard Parkway, San Jose, Calif. 95134.

Figure 13:
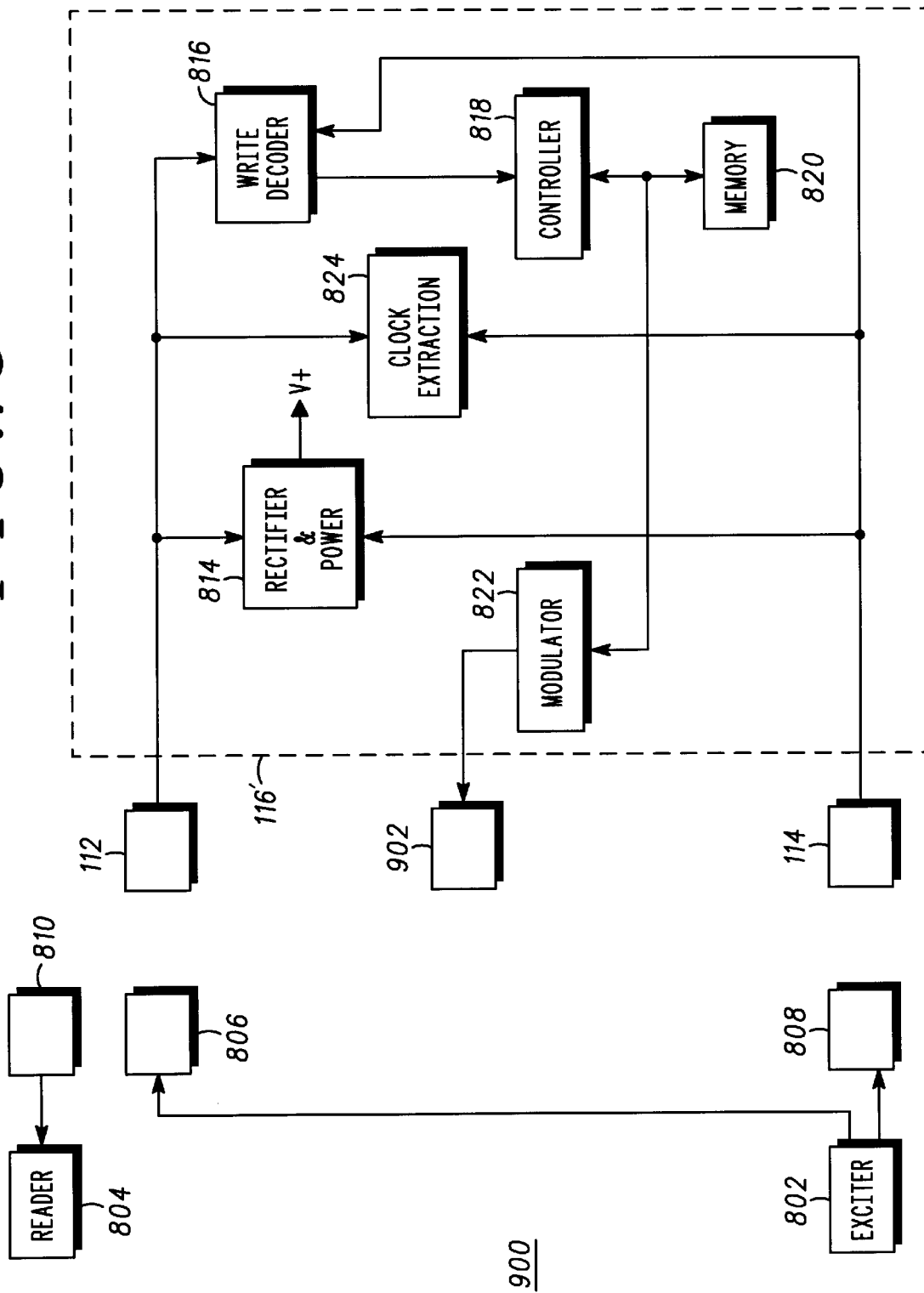
FIG. 13 is a block diagram of another radio frequency identification tag system in accordance with an alternate preferred embodiment of the present invention.

FIG. 13 is a block diagram illustrating an alternate radio frequency identification tag system 900 in accordance with the present invention. Radio frequency identification tag system 900 includes a slightly modified integrated circuit 116'. The system 900 is similar to the system 800 except that modulator 822 of integrated circuit 116' is not coupled to the second electrostatic antenna element 114, but is coupled to a separate electrostatic antenna element 902. This embodiment advantageously has a separate electrostatic antenna element 902 dedicated for data transmission.

Figure 14:
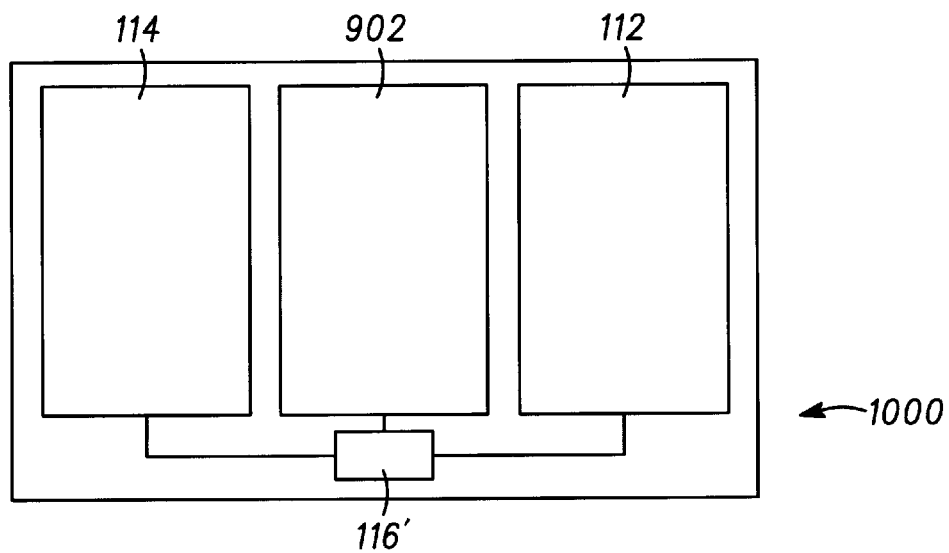
FIG. 14 is a radio frequency identification tag for use in the system of FIG. 13.

FIG. 14 is a back plan view of another embodiment of a radio frequency tag 1000 in accordance with the present invention. Tag 1000 incorporates integrated circuit 116' and consequently has a third electrostatic antenna element 902 formed on substrate 110. Electrostatic antenna element 902 is preferably located between electrostatic antenna elements 112, 114. For dipole coupling between exciter electrostatic antenna elements and tag electrostatic antenna elements 112, 114, third electrostatic antenna element 902 is preferably located within a null region between antennas 112, 114 at a point where the signals from the exciter substantially cancel each other out.

Radio frequency identification tags in accordance with the present invention are useful for numerous applications, including for personal identification in automated gate sentry applications, amusement parks, sporting events, concerts, cruises, ski resorts, vacation resorts and other applications involving personal identification or entitlement. In addition, radio frequency identification tags in accordance with the present invention are useful for article identification for asset tracking, inventory management, mailing labels, animal identification, baggage tracking, parcel tracking and other applications involving the identification of things or storing information associated with things.

In contrast to prior electromagnetic radio frequency identification tags, electrostatic radio frequency identification tags in accordance with the present invention are substantially less expensive due to elimination of an inductive coil, a resonant capacitor, a printed circuit board and lead frame. Also, electrostatic radio frequency identification tags in accordance with the present invention are extremely flat, thin and flexible and therefore, suitable for printing by standard printing processes.

Electrostatic radio frequency identification tags in accordance with the present invention have certain advantages over bar codes and bar code readers, which have traditionally been used for identification of persons and things. In particular, since the stored information in a radio frequency identification tag is stored in an integrated circuit rather than in indicia printed on the tag, the stored information is not subject to corruption or destruction by wear and tear on the tag. In addition, the incorporation of a readable and writeable integrated circuit in a radio frequency identification tag in accordance with the present invention advantageously allows information associated with a person or thing to be readily updated. Bar codes are limited in this aspect.

Typical applications using radio frequency identification tags in accordance with the present invention require that the tag be programmed and printed. For some applications, the tags are completely preprogrammed. For other applications, the tag is programmed just prior to use in order to incorporate certain information unique or related to the person or thing that will be associated with the tag. Therefore, it is desirable to be able to print and program a tag without resort to complex manufacturing processes. The flat, printable tags in accordance with the present invention are easily programmed and printed for a particular application.

For example, a tag in accordance with the present invention is useful as an admissions ticket or pass for a ski resort, amusement park, sporting event, concert or other event. In such applications, it is desirable to have some information preprogrammed into a tag, for example, identification of the event and possibly an identification number associated with the tag. The tag preferably has on a surface the same preprogrammed information indicated by printed or other visual indicia. Prior to use of the tag by an individual, the tag is programmed with information relating to the individual. For example, the tag is programmed with the individual's name, address, social security number, credit card number, or other information related to the individual. After programming, the tag is preferably read to verify that the intended programmed information is stored properly. If the tag is properly programmed, the tag is then printed or otherwise has indicia placed on the tag. Preferably, the indicia placed on the tag coincide with the information stored in the tag.

Applications using tags for the identification of things are similarly programmed and printed with certain information related to the things to be identified. For example, in an inventory tracking application, the tag is programmed with information identifying the type of article, model number and information associated with its manufacture, such as a manufacturing lot and manufacturing location. The tag is preferably also printed with indicia indicating the same information.

Also, in particular where the tag can be read and written, the tag stores a cash value, credit value or entitlement indication, which is incremented or decremented as the tag is used. Loyalty points based on usage are alternatively stored on a tag.

While the present invention has been described in conjunction with a specific embodiment thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims. For example, it will be appreciated by those skilled in the art that there are other materials available, such as silicon-based materials and polymer-based materials, for creating the integrated circuit without departing from the scope and spirit of the present invention. Additionally, the integrated circuit can be a hardware component secured to the substrate or it can be printed onto the substrate without departing from the scope and spirit of the present invention.

We claim:

1. A radio frequency identification (RFID) device comprising:
   a substrate having a first surface and a second surface;
   a first antenna element disposed on the first surface of the substrate;
   a second antenna element disposed on the first surface of the substrate and electrically isolated from the first antenna element;
   a circuit that is electrically connected with the first antenna element and the second antenna element; and
   an adhesive on at least a portion of one of the first antenna element, second antenna element, circuit and first surface of the substrate,
   wherein the circuit includes a power circuit that produces a supply voltage from voltage differences between the first and second antenna elements, and
   wherein the circuit is coupled to the first and second antenna elements by an interposer comprising:
   an interposer substrate;
   a first connecting pad disposed on the interposer substrate;
   a second connecting pad disposed on the interposer substrate and electrically isolated from the first connecting pad; and
   wherein the circuit is coupled to the first and second connecting pads and the first and second connecting pads are coupled to the first and second antenna elements, respectively.

2. The RFID device of claim 6 wherein the substrate is selected from a group consisting of: paper, acetate, polyvinyl chloride, polyester, polyethylene, polypropylene, polypropylene with calcium carbonate, plastic, polymer, styrene, and a non conductive material.

3. The RFID device of claim 6 wherein the circuit further comprises:
   a memory comprising stored digital information; and
   a modulator powered by the power circuit and arranged for generating a signal that is modulated based on the stored digital information.

4. The RFID device of claim 3 further comprising a third antenna element coupled to the modulator.

5. The RFID device of claim 3 wherein the circuit further comprises:
   a write decoder for decoding a modulated write signal into a decoded write command; and
   a controller for writing the memory in response to the decoded write command.

6. The RFID device of claim 1 wherein the circuit is secured directly to the first antenna element and the second antenna element by an adhesive.

7. The RFID device of claim 6 wherein the adhesive is an anisotropic conductive adhesive.

8. The RFID device of claim 6 wherein the adhesive is an isotropic conductive adhesive and the isotropic conductive adhesive used to couple the circuit to the first antenna element is isolated from the isotropic conductive adhesive used to couple the circuit to the second antenna element.

9. The RFID device of claim 1 wherein the circuit is attached to the first antenna element and the second antenna element by a conductive transfer adhesive tape.

10. The RFID device of claim 1 wherein the first surface of the substrate has indicia formed thereon.

11. The RFID device of claim 1 wherein the second surface of the substrate has indicia formed thereon.

12. The RFID device of claim 11 wherein the indicia is formed by a technique selected from a group consisting of: printing, direct thermal imagining, flexographing printing, dye-sublimation printing, offset printing, hot stamping, screen printing, transfer printing, web printing, thermal transfer imaging, xerographic printing, and lithographic printing.

13. The RFID device of claim 1 wherein the substrate is formed from one of the following: a roll of substrate material, a fan-folded arrangement of substrate material, and a sheet of substrate material.

14. The RFID device of claim 1 wherein the first and second antenna elements comprise at least one of the following: conductive ink, silver ink, carbon ink, graphite, metalized polyester, conductive polymers, conductive metal material, and aluminum.

15. The RFID device of claim 1 wherein the first and second antenna elements are disposed on the substrate by a technique selected from a group consisting of: printing, and lamination.

16. The RFID device of claim 1 wherein the first and second antenna elements form a pattern selected from a group consisting of: a bow tie shaped pattern, a checkerboard shaped pattern, a symmetrical shaped pattern, a non-symmetrical shaped pattern, and an unequal shaped pattern.

17. The RFID device of claim 1 wherein the interposer substrate comprises a release liner attached to the interposer substrate by an adhesive.

* * * * *

UNITED STATES PATENT AND TRADEMARK OFFICE
CERTIFICATE OF CORRECTION

PATENT NO. : 6,265,977 B1
DATED : July 24, 2001
INVENTOR(S) : Vega et al.

It is certified that error appears in the above-identified patent and that said Letters Patent is hereby corrected as shown below:

Column 12,
Line 12, "The RFID device of claim 6" should be -- The RFID device of claim 1 --
Line 17, "The RFID device of claim 6" should be -- The RFID device of claim 1 --
Line 48, "direct thermal imagining" should be -- direct thermal imaging --

Signed and Sealed this

Twentieth Day of August, 2002

*Attest:*

*Attesting Officer*

JAMES E. ROGAN
*Director of the United States Patent and Trademark Office*